United States Patent
Alma et al.

(10) Patent No.: US 12,214,751 B2
(45) Date of Patent: Feb. 4, 2025

(54) VEHICLE ROOF LOAD BAR MOUNTING SYSTEM

(71) Applicant: THULE SWEDEN AB, Hillerstorp (SE)

(72) Inventors: Jord Alma, Öxnevalla (SE); Harry Holder, Skillingaryd (SE); David Ardmar, Bankeryd (SE)

(73) Assignee: Thule Sweden AB, Hillerstorp (SE)

( * ) Notice: Subject to any disclaimer, the term of this patent is extended or adjusted under 35 U.S.C. 154(b) by 277 days.

(21) Appl. No.: 17/696,628

(22) Filed: Mar. 16, 2022

(65) Prior Publication Data
US 2022/0297611 A1    Sep. 22, 2022

Related U.S. Application Data

(60) Provisional application No. 63/163,346, filed on Mar. 19, 2021.

(51) Int. Cl.
*B60R 9/058* (2006.01)

(52) U.S. Cl.
CPC ................... *B60R 9/058* (2013.01)

(58) Field of Classification Search
CPC . B60R 9/058; B60R 9/045; B60R 9/08; F16B 21/02
See application file for complete search history.

(56) References Cited

U.S. PATENT DOCUMENTS

| | | | |
|---|---|---|---|
| 7,040,849 B2 | 5/2006 | Cunningham et al. | |
| D727,245 S | 4/2015 | Patel | |
| 9,097,443 B2 | 8/2015 | Liu et al. | |
| 9,266,478 B2 * | 2/2016 | Patel | B60R 9/058 |
| 9,677,674 B2 * | 6/2017 | Spink | F16K 37/0008 |

(Continued)

FOREIGN PATENT DOCUMENTS

| | | |
|---|---|---|
| CN | 206233680 U | 6/2017 |
| DE | 102014101464 A1 | 8/2015 |

(Continued)

OTHER PUBLICATIONS

International Search Report and Written Opinion issued in International Application No. PCT/IB2022/052402, mailed Jun. 14, 2022, 10 pages.

(Continued)

*Primary Examiner* — Brian D Nash
(74) *Attorney, Agent, or Firm* — Sterne, Kessler, Goldstein & Fox P.L.L.C.

(57) ABSTRACT

Systems for mounting a load to a load bar on a vehicle roof include a first twist bracket having a first bracket body and a first mounting head. The first bracket body is configured to be gripped by a user and the first mounting head is configured to mount in a track. A second twist bracket includes a second bracket body and a second mounting head. The second bracket body is configured to be gripped by the user and the second mounting head is configured to mount in the track. A mounting plate is secured to the first twist bracket by a first fastener and to the second twist bracket by a second fastener. The first mounting head and the second mounting head are configured to be removably released from the track by rotating the first twist bracket and the second twist bracket, respectively.

26 Claims, 12 Drawing Sheets

(56) References Cited

U.S. PATENT DOCUMENTS

| | | | |
|---|---|---|---|
| 10,131,288 B2* | 11/2018 | Elliott | B60R 9/05 |
| 10,189,420 B2* | 1/2019 | Settelmayer | B60R 9/10 |
| 10,543,771 B2 | 1/2020 | Sautter et al. | |
| 11,414,021 B1* | 8/2022 | Pauli | B60R 9/045 |
| 11,878,657 B1* | 1/2024 | Pauli | B60R 9/045 |
| 2002/0125282 A1 | 9/2002 | Laverack et al. | |
| 2006/0255081 A1* | 11/2006 | Weaver | B60R 9/048 224/567 |
| 2015/0028072 A1 | 1/2015 | Patel | |
| 2015/0030386 A1 | 1/2015 | Carnevali | |
| 2015/0191127 A1* | 7/2015 | Sautter | B60R 9/052 224/331 |
| 2015/0217700 A1* | 8/2015 | Flaherty | B60R 9/10 224/570 |
| 2016/0039350 A1 | 2/2016 | Patel et al. | |
| 2019/0256007 A1* | 8/2019 | Mansour | B60R 9/058 |
| 2020/0386007 A1 | 12/2020 | Lane-Lohse | |
| 2022/0234512 A1* | 7/2022 | Menegazzo | B60R 9/045 |

FOREIGN PATENT DOCUMENTS

| | | |
|---|---|---|
| DE | 202015104059 U1 | 12/2015 |
| DE | 202020000004 U1 | 1/2020 |
| EP | 3372451 A1 | 9/2018 |
| GB | 2436819 A | 10/2007 |
| WO | 2014042770 A1 | 3/2014 |
| WO | 2017091868 A1 | 6/2017 |
| WO | 2020045961 A1 | 5/2020 |

OTHER PUBLICATIONS

"Thule Tepui Series Installation of roof top tent", Jan. 19, 2021, Retrieved from the Internet: URL: https://www.youtube.com/watch?v=XP04_sl2a8l.

"The GFC Superlite RTT Walk Around", Oct. 2, 2020, Retrieved from the Internet: URL: https://www.youtube.com/watch?v=tmySehzfxbs.

"Finally, a Rooftop Tent That Won't Ruin Your Car", Jul. 22, 2020, Retrieved from the Internet: URL: https://www.outsideonline.com/outdoor-gear/cars-trucks/go-fast-campers-superlite-50-rooftop-tent-review/.

Rhino Rack Pioneer Platform (Universal), Retrieved from the Internet: URL: https://www.rhinorack.com/en-us/products/roof-racks/platforms-and-baskets/pioneer-platforms/pioneer-platform-universal-unassembled-large-58-x-46-_ 42115bf.

Replacement Mounting Bracket for Yakima LoadWarrior, MegaWarrior, or SkinnyWarrior Roof Basket, Retrieved from the Internet: URL: https://www.etrailer.com/Accessories-and-Parts/Yakima/Y8870040.html.

"Finally! A Quick Release Roof Top Tent Mounting System", Jul. 6, 2017, Retrieved from the Internet: URL: https://www.youtube.com/watch?v=UqtCXHIDfqo&t=50s.

* cited by examiner

VEHICLE ROOF LOAD BAR MOUNTING SYSTEM

CROSS-REFERENCE TO RELATED APPLICATIONS

This application is claims priority to and the benefit of U.S. Provisional Patent Application No. 63/163,346, filed Mar. 19, 2021, titled "Vehicle Roof Load Bar Mounting System," which is incorporated herein in its entirety by reference thereto.

FIELD

The present disclosure relates to mounting systems and methods for mounting vehicle rooftop loads. More specifically, embodiments of the present disclosure relate to mounting systems that couple a load, for example, a rooftop tent, to a load bar on a vehicle roof.

BACKGROUND

Carrying loads on a vehicle roof expands the load carrying capacity of the vehicle beyond the available volume of the vehicle cabin. Examples of loads that can be carried on a vehicle roof include luggage, containers, bicycles, kayaks, rooftop tents, and cargo platforms. All of these loads need to be secured to the vehicle roof to prevent unwanted movement of the load, especially while the vehicle is moving. Loads are typically secured to the roof rails of a vehicle that run lengthwise along the vehicle roof. Load bars are connected to and span the roof rails and provide a mounting point for rooftop loads. Current systems and methods for securing a load to the load bars often require lengthy assembly of multiple brackets, each having multiple parts. Further, fixing these systems sometimes requires maneuvering or lifting the load after it has been placed on the load bars, which may be difficult if the load is heavy, large, or hard to reach from the ground. There exists a need for improved mounting systems and methods that quickly secure rooftop loads without the need to maneuver the load.

BRIEF SUMMARY

In some embodiments, a system for mounting a load to a load bar on a vehicle roof includes a first twist bracket including a first bracket body and a first mounting head. The first bracket body is configured to be gripped by a user and the first mounting head is configured to mount in a track. In some embodiments, a second twist bracket includes a second bracket body and a second mounting head. The second bracket body is configured to be gripped by the user and the second mounting head is configured to mount in the track. In some embodiments, the system includes a mounting plate secured to the first twist bracket by a first fastener and to the second twist bracket by a second fastener. In some embodiments, the first mounting head and the second mounting head are configured to be removably released from the track by rotating the first twist bracket and the second twist bracket, respectively.

In some embodiments of the mounting system, the first bracket body and the first mounting head are integrally formed. In some embodiments, the second bracket body and the second mounting head are integrally formed. In some embodiments, the first and second mounting heads are configured to be inserted into an opening in the track in a first orientation and rotated approximately 90 degrees to a second orientation by rotating the respective first and second bracket body to prevent removal of the first and second mounting heads from the track.

In some embodiments, the first bracket body includes a first bore, the second bracket body comprises a second bore, and the mounting plate includes a first hole and a second hole. In some embodiments, the first fastener is disposed through the first hole and into the first bore and the second fastener is disposed through the second hole and into the second bore.

In some embodiments, the first bore and the second bore are internally threaded. In some embodiments, the first fastener and the second fastener are externally threaded to mate with first and second bores, respectively.

In some embodiments, the mounting system includes a pair of retainers, each of which is disposed in one of the first twist bracket and the second twist bracket. In some embodiments, each retainer is configured to allow the first and second fasteners to be loosened and tightened in the first and second bores. In some embodiments, each retainer is configured to prevent the first and second fasteners from being fully removed from the first and second bores. In some embodiments, each retainer includes a threaded hole that is coaxially disposed inside one of the first and second fasteners. In some embodiments, each retainer includes a retention fastener that is threaded into one of the threaded holes in one of the first and second fasteners. In some embodiments, the retention fastener is threaded into the hole after the first and second fasteners have been partially inserted into the first and second bores in the first and second twist brackets, respectively. In some embodiments, the retention fastener prevents each of the first and second fasteners from being fully removed from the first and second bores, respectively.

In some embodiments, each retainer includes a hole through one of the first and second fasteners. In some embodiments the hole is oriented perpendicular to an axis of the fastener. In some embodiments each retainer includes a locking pin configured to pass through the hole after the first and second fasteners have been inserted into the first and second bores in the first and second twist brackets, respectively, such that the locking pin prevents each of the first and second fasteners from being removed from the first and second bores, respectively.

In some embodiments, a lock is disposed in the first bracket body of the first twist bracket. In some embodiments, the lock is configured to prevent removal of the first twist bracket from the track in a locked configuration. In some embodiments, the lock includes an external keyhole configured to receive a key that locks and unlocks the lock. In some embodiments, a locking bar is configured to be rotated from a first position to a second position by the key. In some embodiments, disposing the locking bar in the track in the second position prevents removal of the first twist bracket from the track.

In some embodiments of the mounting system, each of the first and second mounting heads includes a neck portion. In some embodiments, the neck portion extends perpendicularly away from an upper surface of the respective first and second bracket body. In some embodiments, the first and second mounting heads include a head portion disposed at a distal end of the neck portion. In some embodiments, the head portion is orientated perpendicular to the neck portion.

In some embodiments, the load is a rooftop tent.

In some embodiments of the mounting system, the mounting plate includes a support bar disposed between a first hole and a second hole. In some embodiments, the support bar is disposed between the first and second brackets. In some embodiments, a surface of the support bar is configured to contact a surface of the load bar. In some embodiments, the mounting plate includes a first surface having a first profile configured to contact a first load bar having a first contact surface when the first surface is facing the first contact surface. In some embodiments, a second surface opposite the first surface has a second profile different than the first profile and is configured to contact a second load bar having a second contact surface when the second surface is facing the second contact surface.

In some embodiments, a system for mounting a load to a load bar of a vehicle includes a first load fastener including a first mounting head configured for insertion into a track. In some embodiments, a first threaded rod is coupled to the first mounting head and extends from the first mounting head such that the first threaded rod extends below the track when the first mounting head is inserted into the track. In some embodiments, a second load fastener includes a second mounting head configured for insertion into the track and a second threaded rod coupled to the second mounting head and extending from the second mounting head such that the second threaded rod extends below the track when the second mounting head is inserted into the track. In some embodiments, a mounting plate is secured to the first load fastener by the first threaded rod extending through a first hole in the mounting plate and secured to the second load fastener by the second threaded rod extending through a second hole in the mounting plate. In some embodiments, the first mounting head and the second mounting head are configured to be removable from the track by rotating the first mounting head and the second mounting head.

In some embodiments of the mounting system, a first cover is disposed around the first load fastener. In some embodiments, a second cover is disposed around the second load fastener. In some embodiments, the first cover includes a lock configured to lock the cover in a locked position. In some embodiments, a length of the cover extending in a direction parallel to the mounting plate in a locked configuration is greater than a width and a height of the first cover.

In some embodiments, the first mounting head and the second mounting head each includes a neck portion that extends perpendicularly away from an upper surface of the respective first and second bracket body and a head portion disposed at a distal end of the neck portion and orientated perpendicular to the neck portion. In some embodiments, the first and second mounting heads are configured to be inserted into an opening in the track in a first orientation and rotated approximately 90 degrees to a second orientation by rotating the respective first and second bracket body to prevent removal of the first and second mounting heads from the track.

In some embodiments, a method of securing a load on a vehicle roof includes coupling the load to a load bar with a mounting system. In some embodiments, coupling the load includes inserting a first mounting head of a first twist bracket of the mounting system into a track coupled to the load. In some embodiments, coupling the load includes rotating the first twist bracket to secure the first mounting head in the track. In some embodiments, coupling the load includes inserting a second mounting head of a second twist bracket of the mounting system into the track. In some embodiments, coupling the load includes rotating the second twist bracket to secure the second mounting head in the track. In some embodiments, the first twist bracket and the second twist bracket are connected by a mounting plate configured to contact the load bar.

In some embodiments of the method, each of the first mounting head and the second mounting head is coupled to its respective twist bracket and includes a neck portion that extends perpendicularly away from an upper surface of the respective first and second bracket body and a head portion disposed at a distal end of the neck portion and orientated perpendicular to the neck portion. In some embodiments, rotating the first and second twist brackets changes the orientation of each of the mounting heads relative to an opening in the track from a first orientation to a second orientation that is approximately 90 degrees from the first orientation such that the second planar portion of each of the mounting heads prevents removal of the first mounting head and the second mounting head from the track.

In some embodiments, the method includes rotating a lock coupled to the first twist bracket. In some embodiments, rotating the lock positions a locking bar in the track to prevent removal of the first mounting head from the track. In some embodiments, the load remains in contact with the load bar while inserting the first mounting head and inserting the second mounting head into the track.

Implementations of any of the techniques described above can include a system, a method, a process, a device, and/or an apparatus. The details of one or more implementations are set forth in the accompanying drawings and the description below. Other features will be apparent from the description and drawings, and from the claims.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the embodiments and, together with the description, further serve to explain the principles and to enable a person skilled in the relevant art(s) to make and use the embodiments. Objects and advantages of illustrative, non-limiting embodiments will become more apparent by describing them in detail with reference to the attached drawings.

DETAILED DESCRIPTION

Figure 1:
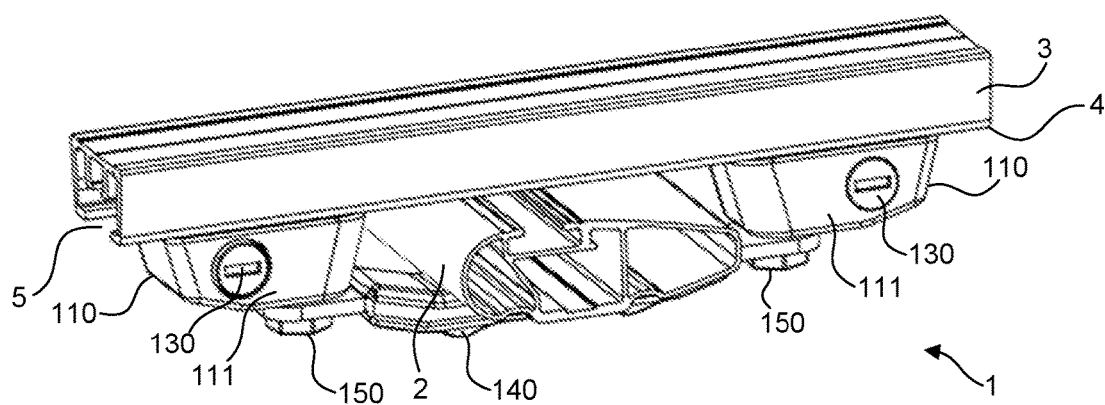
FIG. 1 is a perspective view of a mounting system for a rooftop load mounted to a load bar according to embodiments.

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Spatially relative terms, such as "beneath," "below," "lower," "above," "on," "upper," "opposite" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The term "approximately" as used herein indicates the value of a given quantity that can vary based on a particular technology. Based on the particular technology, the term "approximately" can indicate a value of a given quantity that varies within, for example, 1-15% of the value (e.g., ±1%, ±2%, ±5%, ±10%, or ±15% of the value).

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

As discussed above, rooftop loads need to be secured to the vehicle roof to prevent unwanted movement of the load, especially during vehicle movement. These loads are often secured to load bars that span the vehicle roof rails. Current load mounting devices often include multi-piece brackets that require threading multiple parts together to assemble the bracket. Some of these systems also require lifting or moving the load when assembling the bracket, which can be difficult if the load is heavy, large, or hard to reach from the ground. Therefore, there is a need to provide a mounting system and method with reduced assembly time and reduced or eliminated load maneuvering requirements. An improved mounting system should also minimize individual part count to reduce the possibility of losing necessary parts. Further, the mounting system should be compatible with different load bars for broad compatibility with different rooftop mounting configurations.

The systems and methods discussed in the present disclosure have several advantages. For example, mounting system 1 has the ability to mount the load to load bar 2 from beneath the load without moving track 3 out of contact with load bar 2. The structural features of twist brackets 110 and/or load fasteners 170 at least partially enable this functionality. Furthermore, the structure of mounting system 1 is such that it reduces the possibility of losing necessary parts while mounting and unmounting a rooftop load. Mounting system 1 also has the ability to be adjusted for different combinations of track 3 and load bar 2 by adjusting fasteners 150 and/or the orientation of mounting plate 140. In some embodiments, mounting plate 140 is able to accommodate load bar 2 with different widths and cross-sections. Furthermore, mounting system 1 mounts rapidly and without the need for lengthy tightening or adjusting of fasteners.

FIG. 1 illustrates a perspective view of mounting system 1 according to embodiments. Mounting system 1 is mounted to a load bar 2. Load bar 2 is secured at either end to the roof rails of a vehicle. Mounting system 1 is secured around load bar 2 to a track 3, which is a portion of the structure that is coupled to the load mounted on the vehicle roof. For example, track 3 can be coupled to, and/or form part of the floor of a rooftop vehicle tent.

Figure 2:
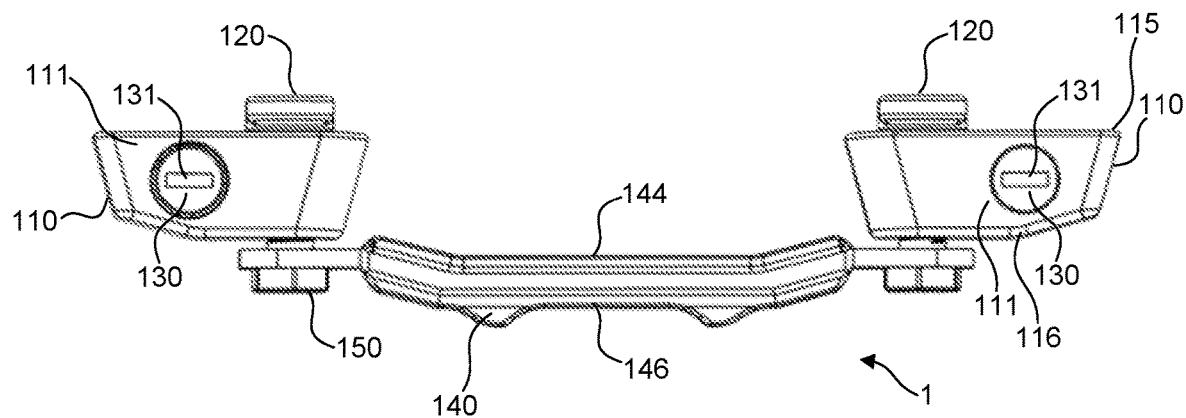
FIG. 2 is a side view of a mounting system for a rooftop load according to embodiments.

FIG. 2 is a side view of mounting system 1 according to embodiments. In some embodiments, two twist brackets 110 can be linked by a mounting plate 140. As shown in FIGS. 1 and 2, mounting plate 140 links twist brackets 110 and is configured to space twist brackets 110 such that load bar 2 passes between twist brackets 110. In some embodiments, load bar 2 is disposed between, and is in contact with, a first surface 144 of mounting plate 140 and a lower surface 4 of track 3, thus securing mounting system 1 to load bar 2. In some embodiments, mounting plate 140 is secured at each end to twist brackets 110, for example, by fasteners 150.

Figure 3:
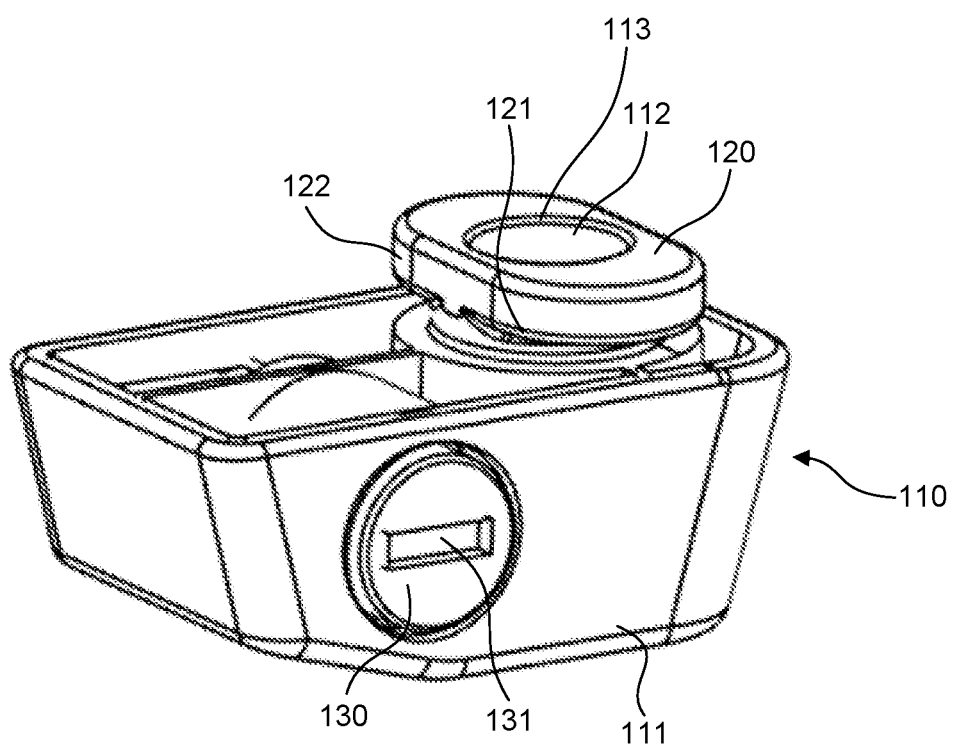
FIG. 3 is a perspective view of a twist bracket according to embodiments.

As shown in FIGS. 2 and 3, for example, twist bracket 110 includes a bracket body 111. In some embodiments, bracket body 111 is shaped to be gripped by a hand of a user, as will be discussed in detail below. In some embodiments, a mounting head 120 is coupled to bracket body 111. In some embodiments, mounting head 120 is rigidly coupled to bracket body 111. Mounting head 120 is configured to releasably mount to track 3. In some embodiments, as shown in FIGS. 2 and 3, mounting head 120 extends above an upper surface 115 of twist bracket 110.

Figure 5A:
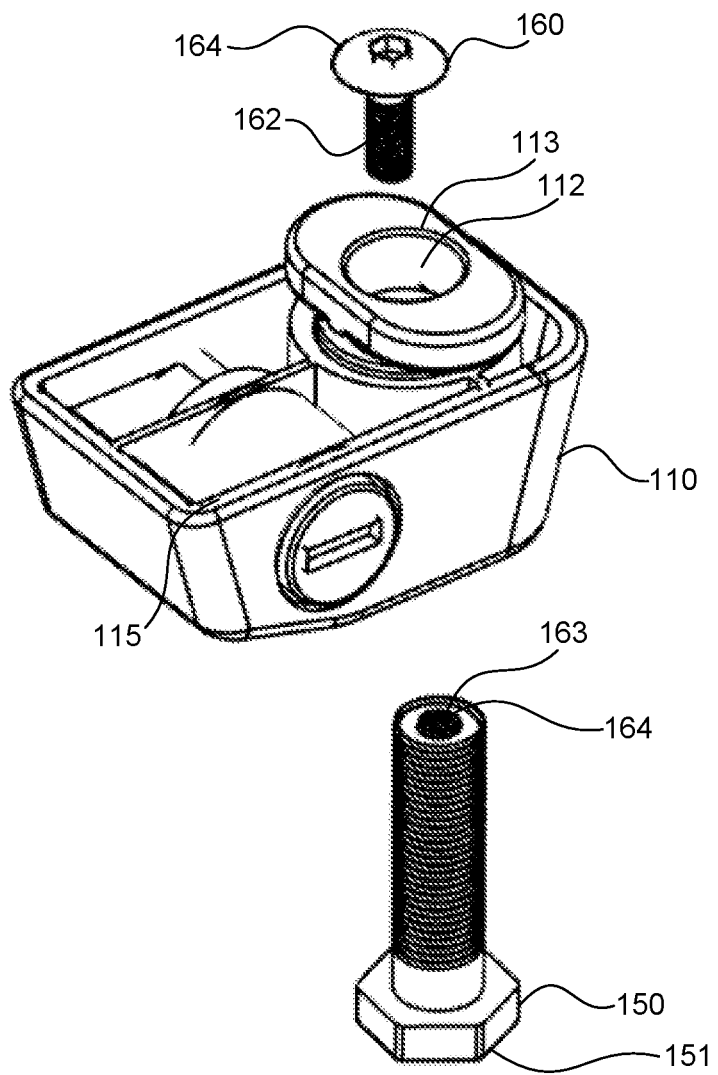
FIGS. 5A-5D are perspective views of a twist bracket with mounting components according to embodiments.
Figure 5B:
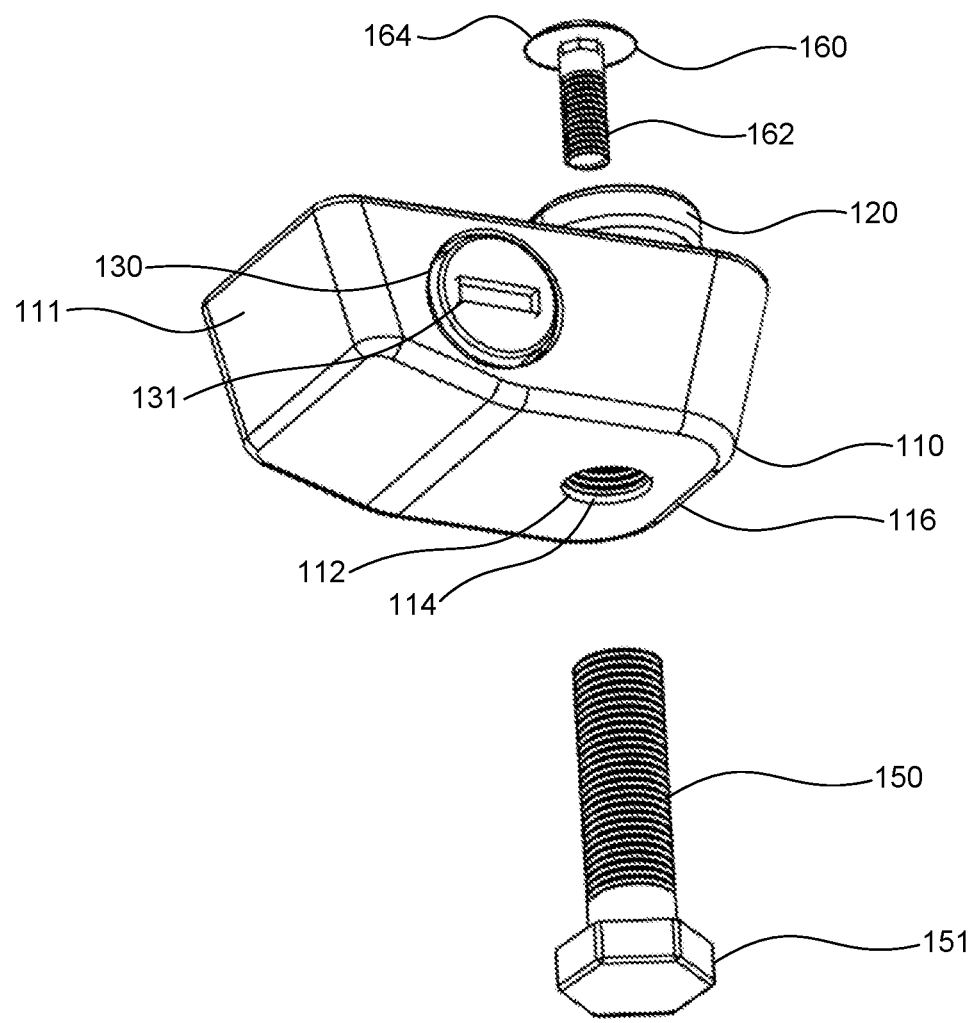

Also shown in FIGS. 3, 5A, and 5B is a bore 112 that, in some embodiments, extends through (e.g., partially or entirely through) bracket body 111. In some embodiments, bore 112 has an opening 113 on an upper surface of bracket body 111 as shown and a corresponding opening 114 on a lower surface 116 of bracket body 111. In some embodiments, bore 112 can be threaded to receive a corresponding threaded fastener 150 (see e.g., FIGS. 5A and 5B) through one of the openings. In some embodiments, the threads extend only partially along bore 112.

As shown in FIG. 3, in some embodiments, mounting head 120 is rigidly coupled with bracket body 111 of twist bracket 110. Thus, movement of bracket body 111, including rotational movement, will move mounting head 120 accordingly. Twist brackets 110 and mounting head 120 can be made from any suitable materials, such as but not limited to plastics, metals, composite materials, or a combination thereof. In some embodiments, twist brackets 110 and mounting head 120 are formed integrally from the same material. For example, they can be formed in the same molding step (e.g., from the same plastic). In some embodiments, mounting head 120 is formed from a different material than twist bracket 110. In some embodiments, mounting head 120 is rigidly coupled to twist bracket 110 by any suitable method, such as adhesives or welding.

Mounting head 120 is configured for removable insertion into track 3. In embodiments as shown in FIG. 3, mounting head 120 forms a "T" shape with a neck portion 121 extending vertically upwards from bracket body 111 (i.e., forming the vertical part of the "T") and a head portion 122 disposed at the distal end of the neck portion 121 and oriented perpendicular to neck portion 121 (i.e., forming the top/horizontal part of the "T"). As shown in FIG. 3, in some embodiments, the mounting head 120 is oriented such that the longest dimension of the head portion 122 is oriented perpendicular to the longest dimension of bracket body 111.

Figure 4A:
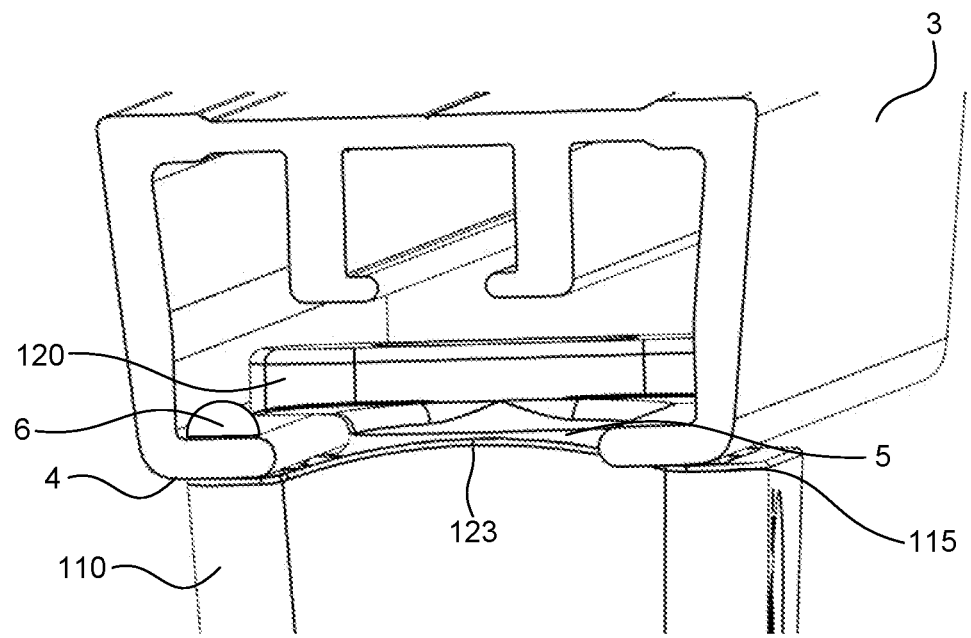
FIG. 4A is a perspective end view of a twist bracket mounted to a track and FIG. 4B is an end view of a twist bracket mounted to a track according to embodiments.
Figure 4B:
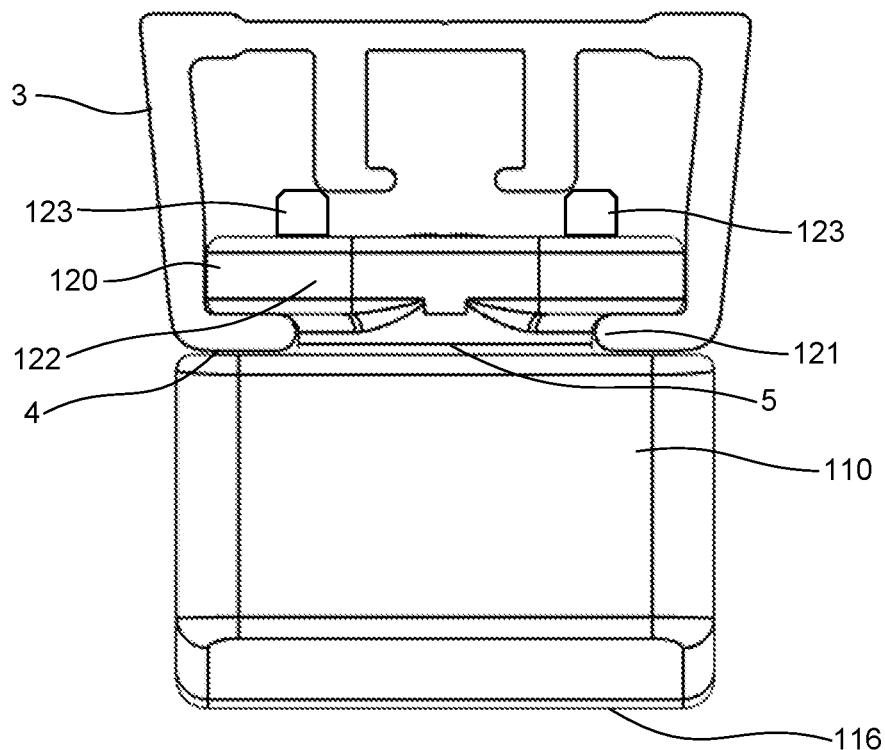

FIGS. 4A and 4B show a mounting head 120 secured in track 3 according to embodiments. Mounting head 120 is inserted (e.g., upward) into a slot 5 in track 3 with the long dimension of head portion 122 oriented parallel to the length of track 3. Once inserted, mounting head 120 is then rotated approximately 90 degrees into a second orientation as shown in FIGS. 4A and 4B. This second orientation aligns the long dimension of head portion 122 perpendicular to the length of track 3, preventing mounting head 120 from being removed from track 3. Removal of mounting head 120 can be accomplished by reversing these steps (i.e., rotating mounting head 120 approximately 90 degrees back to the first orientation and then removing mounting head 120 through the slot 5 in track 3 (e.g., by pulling it downward)).

Also shown in FIGS. 4A and 4B, in some embodiments, one or more mounting protrusions 123 are disposed on twist bracket 110 or mounting head 120. Mounting protrusions 123 are configured to provide tactile feedback while rotating twist bracket 110 to secure mounting head 120 in track 3. For example, in some embodiments as shown in FIG. 4A, mounting protrusion 123 can be an upward extension or bump of upper surface 115 of twist bracket 110 that is configured to be received by slot 5 of track 3 when twist bracket 110 is oriented properly. In some embodiments as shown in FIG. 4B, mounting protrusions 123 can extend above mounting head 120 and interfere with track 3 until mounting head 120 is twisted into the second orientation as shown in FIG. 4B, thereby providing physical feedback that mounting head 120 is in the locked position.

Figure 6A:
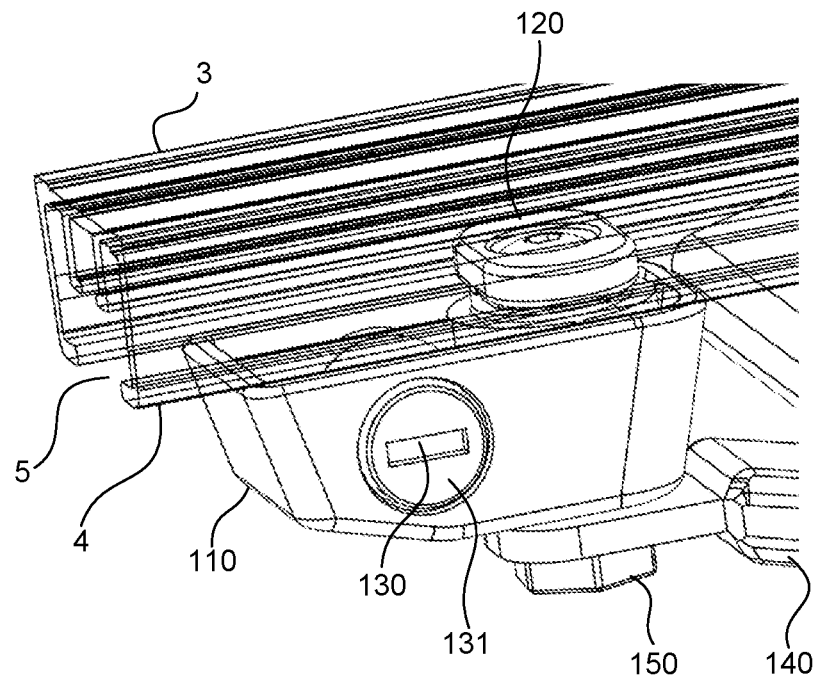
FIGS. 6A and 6B are perspective views of a twist bracket mounted to a track showing a lock in unlocked (6A) and locked (6B) configurations according to embodiments.
Figure 6B:
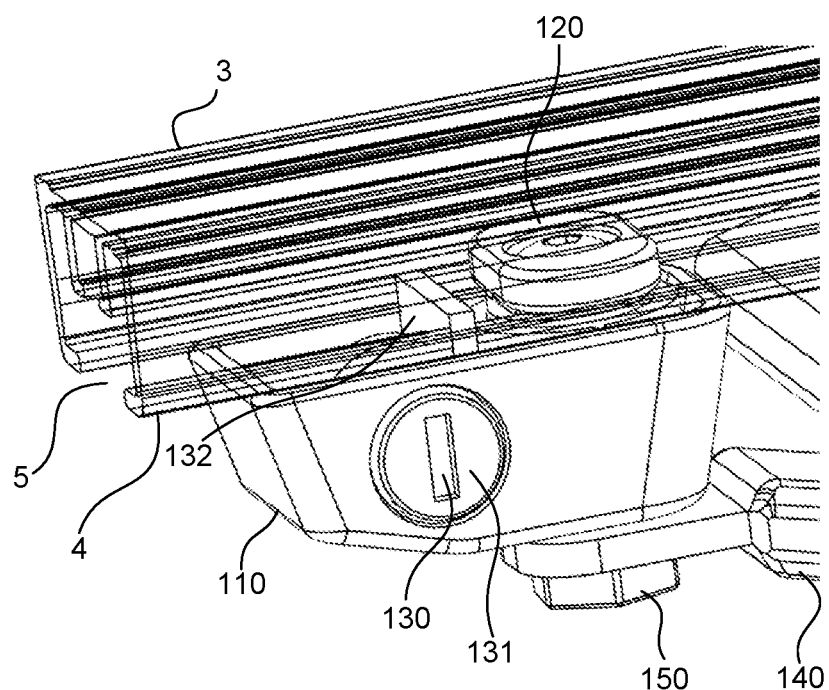

In some embodiments, twist bracket 110 includes a lock 130. Lock 130 is configured to prevent removal of twist bracket 110 from track 3. In some embodiments, lock 130 can include a keyhole 131, as shown in FIG. 3. Keyhole 131 is configured to accept a key to lock and unlock lock 130 by, for example, rotation. Lock 130 can prevent removal of twist bracket 110 from track 3 by interfering with rotation of twist bracket 110 relative to track 3. For example, as shown in FIG. 6B, lock 130 can include a locking lever 132 that, after rotating keyhole 131, extends into the slot 5 in track 3 where the mounting head 120 is inserted. Locking lever 132 thus prevents rotation of twist bracket 110, which prevents removal of mounting head 120. FIG. 6A shows the same view as FIG. 6B with locking lever 132 retracted into twist bracket 110 (e.g., by inserting a key into keyhole 131 and rotating the key).

In some embodiments as shown, for example, in FIG. 4A, track 3 can include a stopper 6. Stopper 6 prevents removal of mounting head 120 from track 3 by sliding mounting head 120 out of the open end of track 3 without twisting mounting head 120 (or twisting bracket 110). In some embodiments as shown in FIG. 4A, stopper 6 can be a flange or protrusion disposed on the interior or end of track 3 that blocks mounting head 120 from sliding out of track 3. In some embodiments, stopper 6 can be a removable fastener that passes through track 3 and blocks mounting head 120 from sliding out of track 3. In some embodiments, stopper 6 can be an endcap that is removably secured to the end of track 3 and that covers and blocks the opening of track 3, thereby preventing mounting head 120 from sliding out of the open end. In some embodiments, stopper 6 can be a thicker portion of the walls of track 3 that prevents mounting head 120 from slinging out of track 3.

Figure 7A:
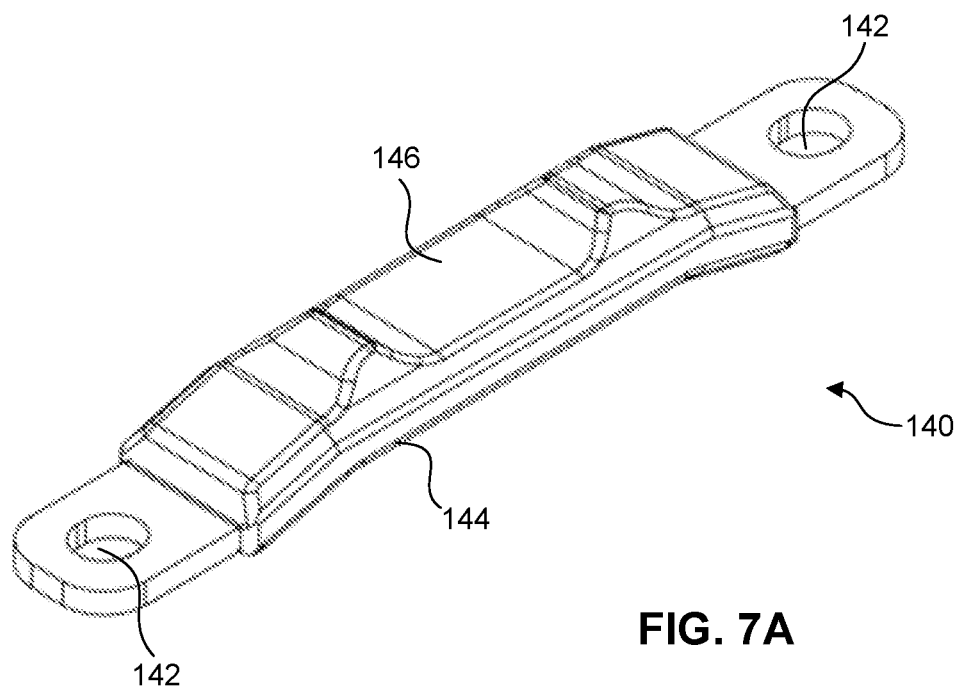
FIGS. 7A and 7B are perspective views of a mounting plate according to embodiments.
Figure 7B:
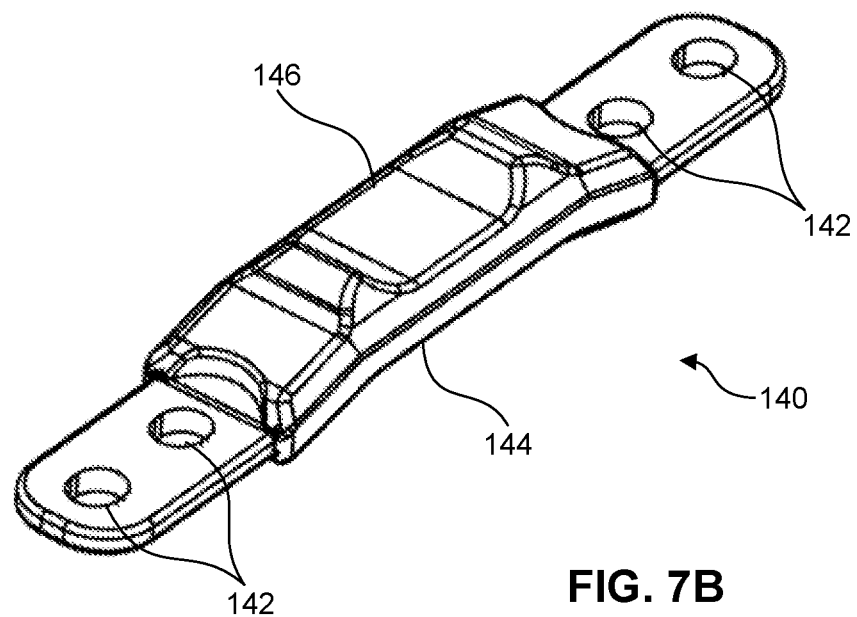
Figure 8A:
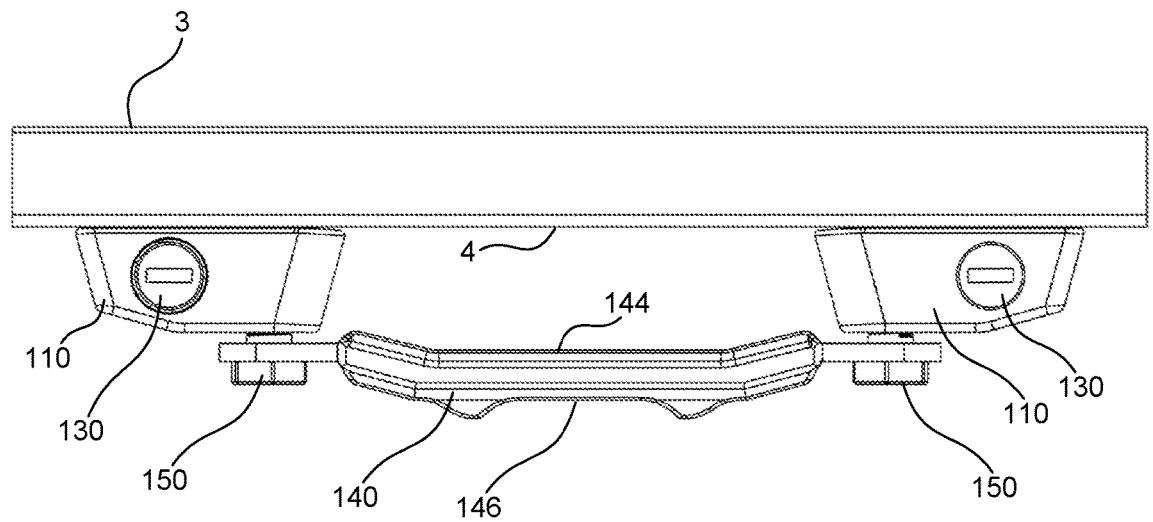
FIGS. 8A and 8B are side views of a mounting system with a mounting plate in different configurations according to embodiments.
Figure 8B:
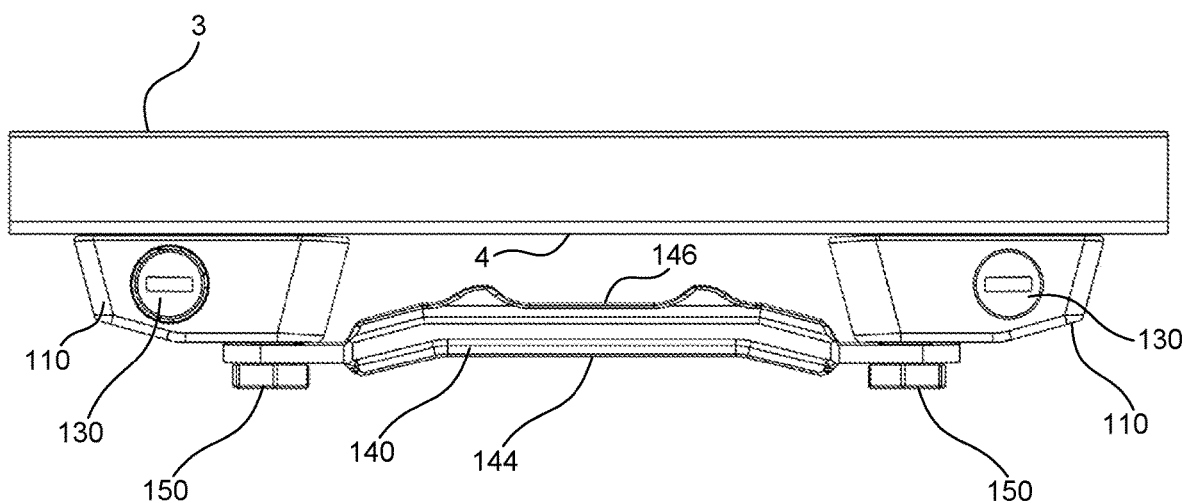

As discussed above, in some embodiments a pair of twist brackets 110 are connected by mounting plate 140 in mounting system 1. Perspective views of embodiments of mounting plate 140 are shown in FIGS. 7A and 7B. In some embodiments as shown in FIG. 7A, mounting plate 140 has two holes 142 that allow fasteners 150 to pass through mounting plate 140 (see e.g., FIG. 2) and into bore 112 in each of twist brackets 110. In some embodiments, mounting plate 140 can have more than two holes 142. For example, as shown in FIG. 7B, mounting plate 140 can have four holes 142, or more. Additional holes 142 can provide more adjustability to mounting system 1 to accommodate wider or narrower load bars 2. In some embodiments, fasteners 150 can be threaded fasteners configured to thread into corresponding threaded portions of bores 112. As shown in FIGS. 8A and 8B, in some embodiments, mounting plate 140 can be reversible, in that it can have different surface profiles on first surface 144 and a second surface 146 opposite first surface 144 to accommodate different load bar sizes, shapes, and cross-sections. Mounting plate 140 can be reversed by simply removing fasteners 150 and then changing which surface 144, 146 faces twist brackets 110. This enables mounting system 1 to accommodate different types of load bars 2 by selecting which surface 144, 146 of mounting plate 140 contacts load bar 2.

In some embodiments as shown in FIGS. 5A and 5B, for example, mounting system 1 includes a retainer 160, for example, disposed in each mounting head 120 and/or twist bracket 110 that is configured to prevent removal of fastener 150 from twist bracket 110. This provides that fastener 150 cannot be accidentally separated from mounting system 1. In some embodiments, retainer 160 is a threaded fastener 162. In some embodiments, a corresponding hole 163 is formed in fastener 150 and is threaded to receive threaded fastener 162. An opening 164 of hole 163 is formed opposite a head 151 of fastener 150. When fastener 150 is inserted into bore 112, threaded fastener 162 is threaded into fastener 150 through hole 163 from the upper surface 115 (i.e., closest to mounting head 120) of twist bracket 110 through bore 112. This prevents removal of fastener 150 because threaded fastener 162 cannot pass through bore 112. In some embodiments, a portion of bore 112 that is closest to mounting head 120 has a diameter that allows a head 165 of threaded fastener 162 to enter bore 112 (i.e., the opening of bore 112 closest to mounting head 120 is formed with a counter bore), but it cannot pass through bore 112 due to the smaller inner diameter of bore 112. This allows threaded fastener 162 to be completely disposed inside twist bracket 110 and thus not interfere with the mounting of twist bracket 110 to track 3. In some embodiments, retainer 160 can include, for example, a locking nut and washer that threads onto the end of fastener 150 but otherwise functions identically to retainer fastener 162.

Figure 5C:
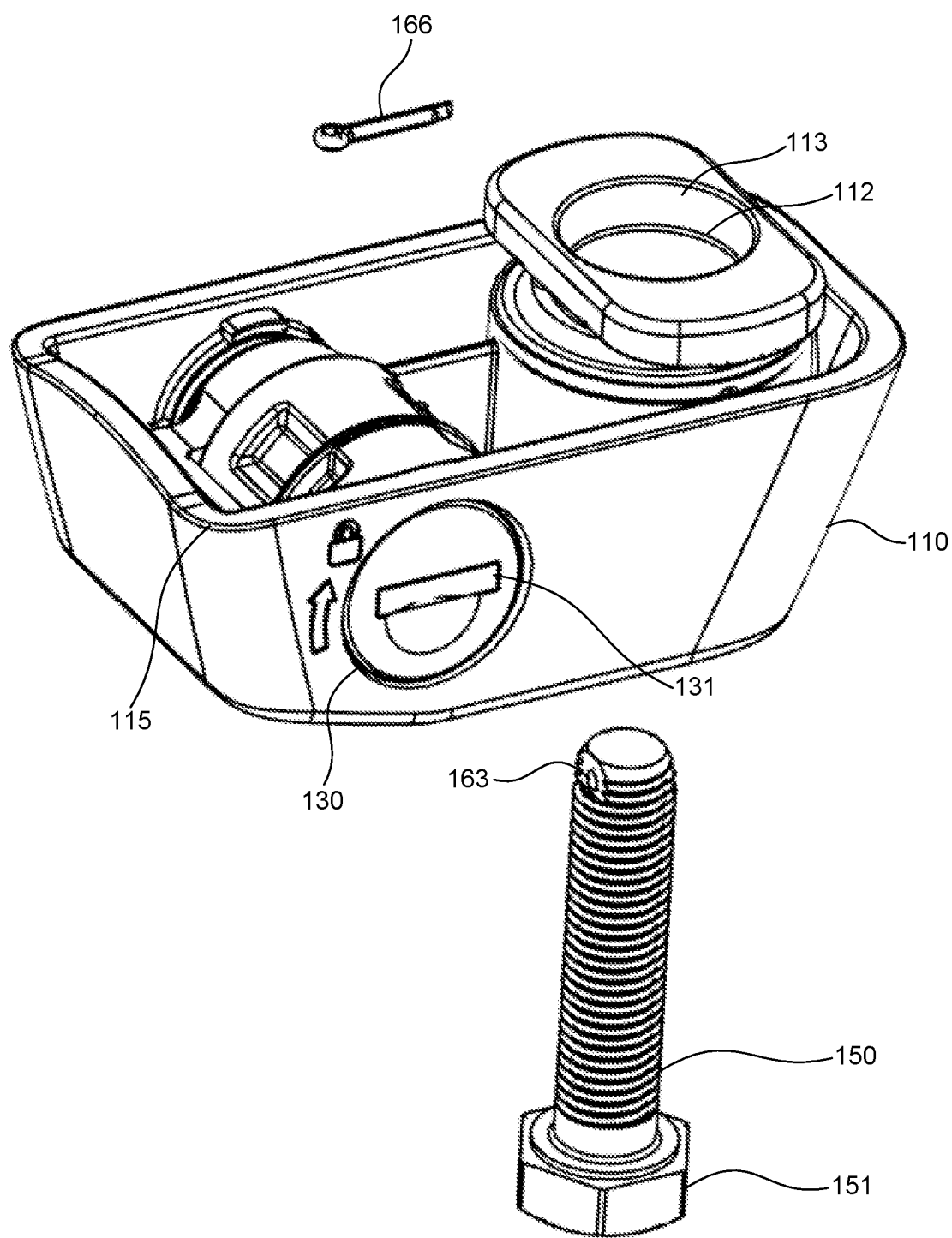
Figure 5D:
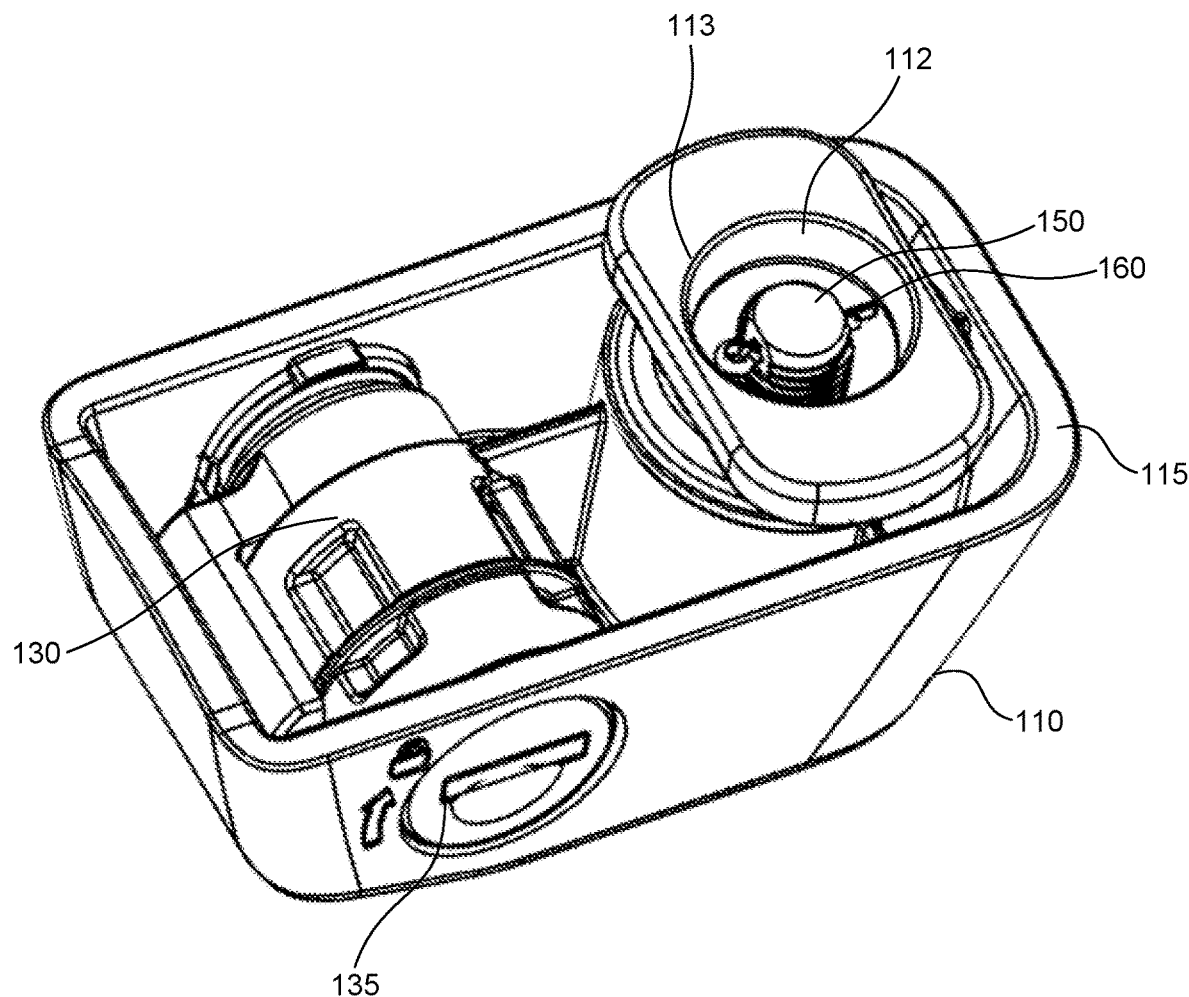

In some embodiments as shown in FIGS. 5C and 5D, retainer 160 is a locking pin or cotter pin 166 that is inserted into an end of fastener 150 through hole 163 formed in fastener 150. In some embodiments, hole 163 is perpendicular to the lengthwise axis of fastener 150 and is disposed opposite head 151 near the end of fastener 150. After fastener 150 is threaded into bore 112, locking pin 166 can be inserted into hole 163, blocking removal of fastener 150 through bore 112.

Figure 9:
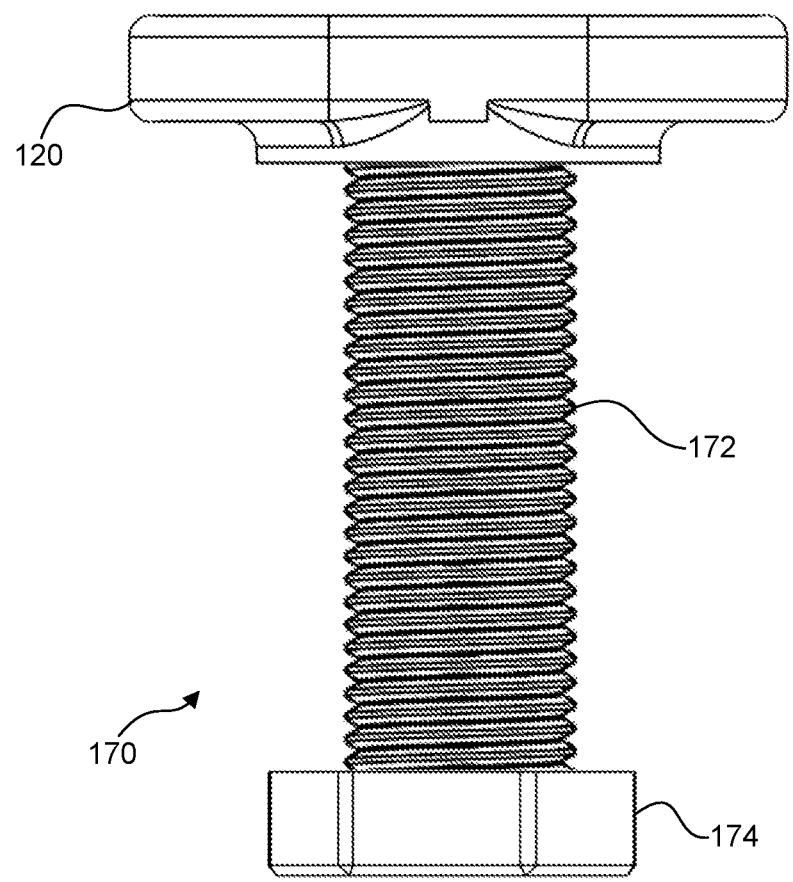
FIG. 9 is a side view of a load fastener according to embodiments.
Figure 10:
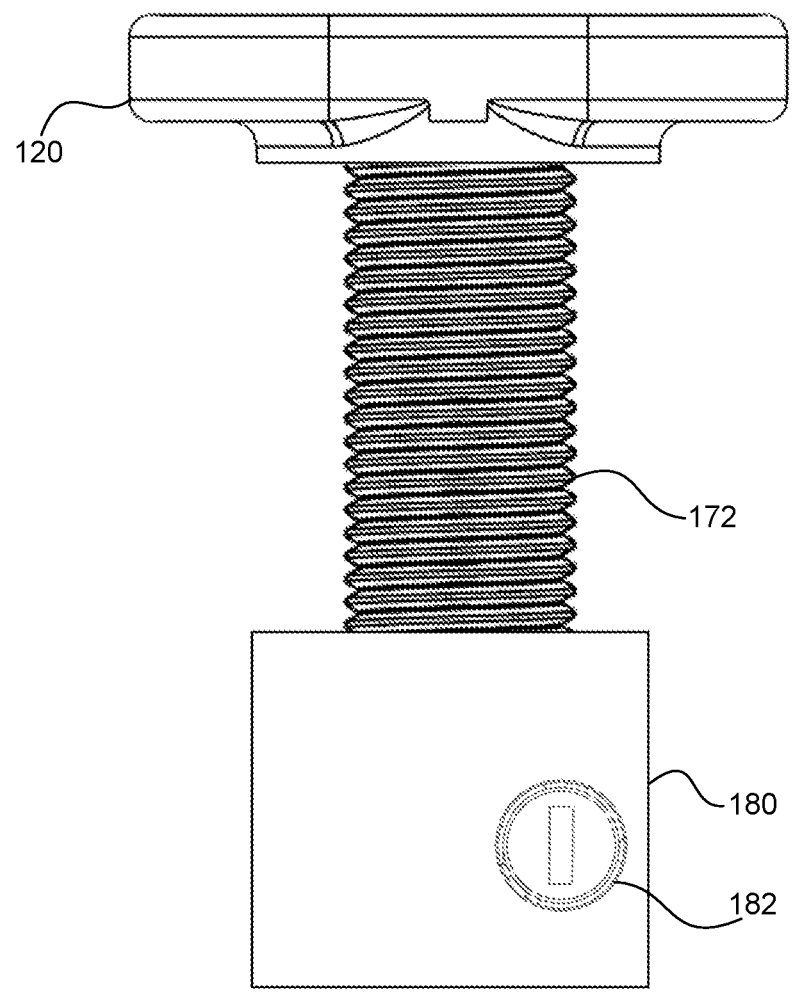
FIG. 10 is a side view of a load fastener with a cover according to embodiments.

In some embodiments, mounting system 1 includes a pair of load fasteners 170, as shown in FIGS. 9 and 10, that are removably coupled to track 3. Each load fastener 170 includes a mounting head 120, as discussed above. Extending from the bottom of mounting head 120 is a threaded rod 172, which is passed through holes 142 in mounting plate 140. Nuts 174 can be placed on the end of threaded rod 72 to secure mounting plate 140.

In some embodiments, mounting system 1 can include one or more covers 180 (see e.g., FIG. 10) that are removably disposed around load fasteners 170 (e.g., around threaded rod 172). In some embodiments, cover 180 can cover a portion of threaded rod 172, and in some embodiments cover at least threaded rod 172 and nut 174. This prevents access to threaded rod 172 and nut 174, which prevents unwanted removal of mounting system 1. In some embodiments, cover 180 can include a cover lock 182 that is configured to lock cover 180 closed. Cover lock 182 can include a keyhole 183 to lock and unlock cover lock 182.

Methods of using embodiments of mounting system 1 can include placing a load onto load bar 2 on a vehicle roof. The load can include, for example, track 3. In some embodiments, this load is a rooftop tent. In some embodiments, track 3 can be coupled to or be part of a rooftop tent. In some embodiments, track 3 rests directly on load bar 2, as shown for example in FIG. 1. Mounting system 1 is configured for mounting by disposing twist brackets 110 in a first orientation such that mounting heads 120 are aligned with a slot 5 in the lower surface 4 of track 3 (i.e., the direction facing load bar 2). In some embodiments, this first orientation aligns the longest dimension of a head portion 122 of a "T" shaped mounting head 120 with the length of track 3. Mounting system 1 can be placed around load bar 2 by positioning twist brackets 110 on either side of load bar 2 with load bar 2 above mounting plate 140. Mounting heads 120 can be inserted into the slot 5 of track 3 from the bottom of track 3. After insertion, twist brackets 110 (and, thus mounting head 120) can be rotated into a second orientation that secures mounting head 120 into track 3. In some embodiments, this rotation includes rotating twist brackets 110 approximately 90 degrees so that the longest dimension of head portion 122 of mounting head 120 is disposed perpendicular to the slot 5 of track 3, which results in an orientation as shown in FIG. 4. In some embodiments, fasteners 150 can be adjusted to tighten the fit between mounting plate 140, load bar 2, and track 3. This step is often needed only on the first installation of mounting system 1 to a new load bar 2 and track 3. In some embodiments, this step can include removing and reversing the orientation of mounting plate 140 to ensure proper contact between mounting plate 140 and load bar 2.

It is to be appreciated that the Detailed Description section, and not the Brief Summary and Abstract sections, is intended to be used to interpret the claims. The Summary and Abstract sections may set forth one or more but not all embodiments of the support assembly system and apparatus, and thus, are not intended to limit the present embodiments and the appended claims.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A system for mounting a load to a load bar on a vehicle roof, the system comprising:
    a first twist bracket comprising a first bracket body and a first mounting head, wherein the first bracket body is configured to be gripped by a user, and wherein the first mounting head is configured to mount in a track;
    a second twist bracket comprising a second bracket body and a second mounting head, wherein the second bracket body is configured to be gripped by the user, and wherein the second mounting head is configured to mount in the track; and
    a mounting plate secured to the first twist bracket by a first fastener and to the second twist bracket by a second fastener,
    wherein the first mounting head and the second mounting head are configured to be removably released from the track by rotating the first twist bracket and the second twist bracket, respectively.

2. The system of claim 1, wherein the first bracket body and the first mounting head are integrally formed, and wherein the second bracket body and the second mounting head are integrally formed.

3. The system of claim 1, wherein the first and second mounting heads are configured to be inserted into an opening in the track in a first orientation and rotated approximately 90 degrees to a second orientation by rotating the respective first and second bracket body to prevent removal of the first and second mounting heads from the track.

4. The system of claim 1, wherein the first bracket body comprises a first bore, the second bracket body comprises a second bore, and the mounting plate comprises a first hole and a second hole; and wherein the first fastener is disposed through the first hole and into the first bore and the second fastener is disposed through the second hole and into the second bore.

5. The system of claim 4, wherein the first bore and the second bore are internally threaded, and wherein the first fastener and the second fastener are externally threaded to mate with first and second bores, respectively.

6. The system of claim 4, further comprising:
    a pair of retainers, each of which is disposed in one of the first twist bracket and the second twist bracket, wherein each retainer is configured to allow the first and second fasteners to be loosened and tightened in the first and second bores, and is further configured to prevent the first and second fasteners from being fully removed from the first and second bores.

7. The system of claim 6, wherein each retainer comprises a threaded hole that is coaxially disposed inside one of the first and second fasteners; and
    wherein each retainer further comprises a retention fastener that is threaded into one of the threaded holes in one of the first and second fasteners after the first and second fasteners have been partially inserted into the first and second bores in the first and second twist brackets, respectively, such that the retention fastener prevents each of the first and second fasteners from being fully removed from the first and second bores, respectively.

8. The system of claim 7, wherein each retainer comprises a hole through one of the first and second fasteners, wherein the hole is oriented perpendicular to an axis of the fastener; and wherein each retainer comprises a locking pin configured to pass through the hole after the first and second fasteners have been inserted into the first and second bores in the first and second twist brackets, respectively, such that the locking pin prevents each of the first and second fasteners from being removed from the first and second bores, respectively.

9. The system of claim 1, further comprising:
a lock disposed in the first bracket body of the first twist bracket, the lock configured to prevent removal of the first twist bracket from the track in a locked configuration.

10. The system of claim 9, wherein the lock comprises:
an external keyhole configured to receive a key that locks and unlocks the lock; and
a locking bar configured to be rotated from a first position to a second position by the key, wherein the locking bar is disposed in the track in the second position to prevent removal of the first twist bracket from the track.

11. The system of claim 1, wherein each of the first and second mounting heads comprises a neck portion that extends perpendicularly away from an upper surface of the respective first and second bracket body and a head portion disposed at a distal end of the neck portion and orientated perpendicular to the neck portion.

12. The system of claim 1, wherein the load is a rooftop tent.

13. The system of claim 1, wherein the mounting plate comprises a support bar disposed between a first hole and a second hole, wherein the support bar is disposed between the first and second twist brackets, and wherein a surface of the support bar is configured to contact a surface of the load bar.

14. The system of claim 1, wherein the mounting plate comprises:
a first surface having a first profile configured to contact a first load bar having a first contact surface when the first surface is facing the first contact surface; and
a second surface opposite the first surface, the second surface having a second profile different than the first profile and configured to contact a second load bar having a second contact surface when the second surface is facing the second contact surface.

15. The system of claim 1, wherein the track is continuous.

16. The system of claim 1, wherein the track comprises an elongated slot.

17. The system of claim 1, wherein the first mounting head comprises a long dimension configured to releasably engage the track and a width dimension less than the long dimension.

18. A system for mounting a load to a load bar of a vehicle, the system comprising:
a first load fastener comprising a first mounting head configured for insertion into a track and a first threaded rod coupled to the first mounting head and extending from the first mounting head such that the first threaded rod extends below the track when the first mounting head is inserted into the track;
a second load fastener comprising a second mounting head configured for insertion into the track and a second threaded rod coupled to the second mounting head and extending from the second mounting head such that the second threaded rod extends below the track when the second mounting head is inserted into the track; and
a mounting plate secured to the first load fastener by the first threaded rod extending through a first hole in the mounting plate and secured to the second load fastener by the second threaded rod extending through a second hole in the mounting plate,
wherein the first mounting head and the second mounting head are configured to be removable from the track by rotating the first mounting head and the second mounting head.

19. The system of claim 18, further comprising a first cover disposed around the first load fastener and a second cover disposed around the second load fastener.

20. The system of claim 19, wherein the first cover comprises a lock configured to lock the cover in a locked position.

21. The system of claim 19, wherein a length of the first cover extending in a direction parallel to the mounting plate in a locked configuration is greater than a width and a height of the first cover.

22. The system of claim 18, wherein the first mounting head and the second mounting head each comprises a neck portion that extends perpendicularly away from an upper surface of respective first and second bracket bodies of the first and second load fasteners and a head portion disposed at a distal end of the neck portion and orientated perpendicular to the neck portion, and
wherein the first and second mounting heads are configured to be inserted into an opening in the track in a first orientation and rotated approximately 90 degrees to a second orientation by rotating the respective first and second bracket body to prevent removal of the first and second mounting heads from the track.

23. A method of securing a load on a vehicle roof, the method comprising:
coupling the load to a load bar with a mounting system, wherein coupling the load comprises:
inserting a first mounting head of a first twist bracket of the mounting system into a track coupled to the load;
rotating the first twist bracket to secure the first mounting head in the track;
inserting a second mounting head of a second twist bracket of the mounting system into the track; and
rotating the second twist bracket to secure the second mounting head in the track,
wherein the first twist bracket and the second twist bracket are connected by a mounting plate configured to contact the load bar.

24. The method of claim 23, wherein each of the first mounting head and the second mounting head is coupled to its respective twist bracket and comprises a neck portion that extends perpendicularly away from an upper surface of respective first and second bracket bodies of the first and second twist brackets and a head portion disposed at a distal end of the neck portion and orientated perpendicular to the neck portion, and
wherein rotating the first and second twist brackets changes the orientation of each of the mounting heads relative to an opening in the track from a first orientation to a second orientation that is approximately 90 degrees from the first orientation such that the second planar portion of each of the mounting heads prevents removal of the first mounting head and the second mounting head from the track.

25. The method of claim 23, further comprising rotating a lock coupled to the first twist bracket, wherein rotating the lock positions a locking bar in the track to prevent removal of the first mounting head from the track.

26. The method of claim 23, wherein the load remains in contact with the load bar while inserting the first mounting head and inserting the second mounting head into the track.

\* \* \* \* \*